(12) United States Patent
Liou et al.

(10) Patent No.: US 7,682,113 B2
(45) Date of Patent: Mar. 23, 2010

(54) EXTENDABLE GANTRY

(75) Inventors: Pzung-Cheng Liou, Taichung (TW); Don-Hua Cheng, Taichung (TW)

(73) Assignee: Hiwin Mikrosystems Corp., Taichung (TW)

( * ) Notice: Subject to any disclaimer, the term of this patent is extended or adjusted under 35 U.S.C. 154(b) by 53 days.

(21) Appl. No.: 12/228,049

(22) Filed: Aug. 8, 2008

(65) Prior Publication Data

US 2010/0032396 A1  Feb. 11, 2010

(51) Int. Cl.
    *B23C 1/08* (2006.01)
(52) U.S. Cl. ................................ 409/212; 409/213
(58) Field of Classification Search .......... 409/202, 409/212, 235, 192, 203, 213, 217; 408/53, 408/43, 42
    See application file for complete search history.

(56) References Cited

U.S. PATENT DOCUMENTS

| | | | | | |
|---|---|---|---|---|---|
| 4,326,824 | A | * | 4/1982 | Lasermann et al. | 409/213 |
| 5,062,195 | A | * | 11/1991 | Binder | 483/15 |
| 5,081,889 | A | * | 1/1992 | Takano et al. | 82/122 |
| 5,375,952 | A | * | 12/1994 | Line | 409/202 |
| 5,839,323 | A | * | 11/1998 | Line | 409/202 |
| D418,528 | S | * | 1/2000 | Honjo et al. | D15/199 |
| 6,067,695 | A | * | 5/2000 | Momoitio | 409/202 |
| 6,409,642 | B2 | * | 6/2002 | Tominaga et al. | 409/202 |
| 2008/0254959 | A1 | * | 10/2008 | Takayama et al. | 483/32 |

FOREIGN PATENT DOCUMENTS

| | | | |
|---|---|---|---|
| JP | 62-099012 A | * | 5/1987 |
| JP | 64-002400 A | * | 1/1989 |

* cited by examiner

*Primary Examiner*—Erica E Cadugan
(74) *Attorney, Agent, or Firm*—Charles E. Baxley

(57) ABSTRACT

An extendable gantry comprises a base and an extendable transverse bridge mounted on the base. The extendable transverse bridge has an axial length greater than a width of the base.

5 Claims, 6 Drawing Sheets

EXTENDABLE GANTRY

BACKGROUND OF THE INVENTION

1. Technical Field

The present invention relates to machining centers having gantries, and more particularly, to a multi-tool gantry machining center constructed from an extendable transverse bridge that is installed thereon with a plurality of movable seats each carrying a tool.

2. Description of Related Art

A conventional gantry machining center, as provided in FIGS. 1 and 2, comprises a base 10, a transverse bridge 11 that is mounted on the base 10 and reciprocates along a direction parallel to a Y-axis of the base 10, and a movable seat 12 that reciprocates along a direction parallel to an X-axis of the base 10. The movable seat 12 carries a tool serving to process workpieces.

As to a multi-tool gantry machining center, plural said movable seats 12 are settled on the transverse bridge 11 for carrying different tools. However, the number of said movable seats 12 settled on the transverse bridge 11 is in inverse proportion to the travel length of each said movable seat 12. In other words, the travel length decreases as the number of the movable seats 12 increases. Consequently, the give and take between diversity of tools and processing efficiency of the tools has become a difficult choice to machine designers.

SUMMARY OF THE INVENTION

One objective of the present invention is to provide an extendable gantry installed with a plurality of movable seats, wherein each said movable seat carries a tool and has a travel length answering to particular processing needs.

Another objective of the present invention is to provide an extendable gantry that comprises a base and an extendable transverse bridge that has an axial length greater than a width of the base, wherein the extendable transverse bridge allows plural movable seats installed thereon while a travel length of each said movable seats are not in inverse proportion to the number of the movable seats and no additional length of the base is required for quantitative increase of the movable seats, thereby eliminating additional costs for constructing the base 20 larger for supporting more movable seats.

Another objective of the present invention is to provide an extendable gantry that comprises a base and an extendable transverse bridge having an axial length greater than a width of the base, wherein the extendable transverse bridge allows at least one movable seat carrying a tool to move within a working area thereof and process a workpiece while other plural movable seats each carrying a tool and in idleness stay still in a waiting area thereof.

To achieve the aforesaid objectives, the extendable gantry of the present invention comprises a base and an extendable transverse bridge that is mounted on the base to reciprocate along a direction parallel to a Y-axis of the base and has an axial length greater than a width of the base, wherein the extendable transverse bridge extends beyond and juts out one of two opposite laterals of the base along a direction parallel to an X-axis of the base while the extendable transverse bridge includes at least one working area and at least one waiting area.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENTS

While a preferred embodiment is provided herein for illustrating the concept of the present invention as described above, it is to be understood that the components in these drawings are made for better explanation and need not to be made in scale. Moreover, in the following description, resemble components are indicated by the same numerals.

Figure 1:
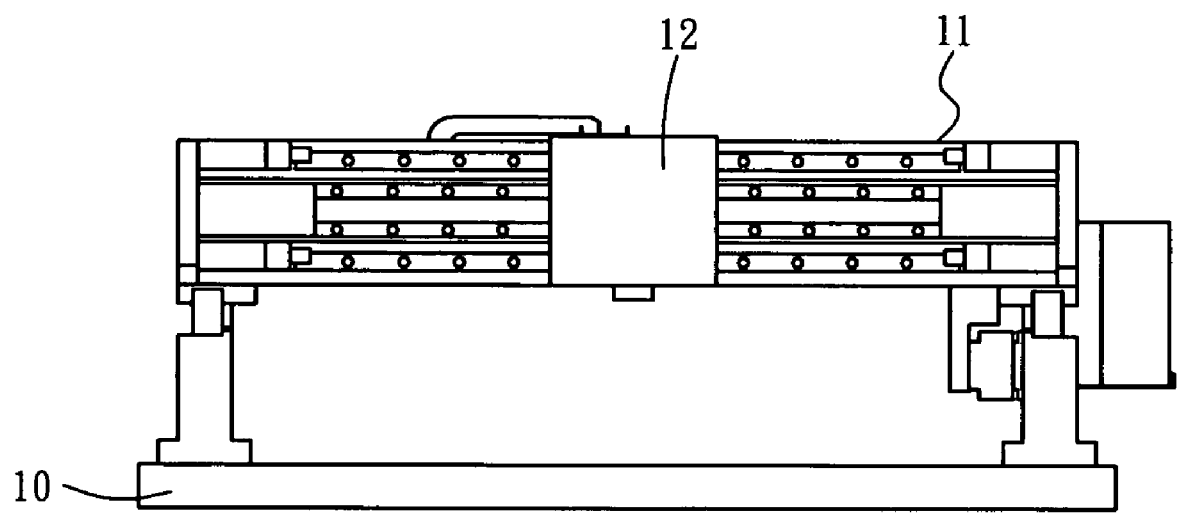
FIG. 1 is a front view of a conventional gantry machining center.
Figure 2:
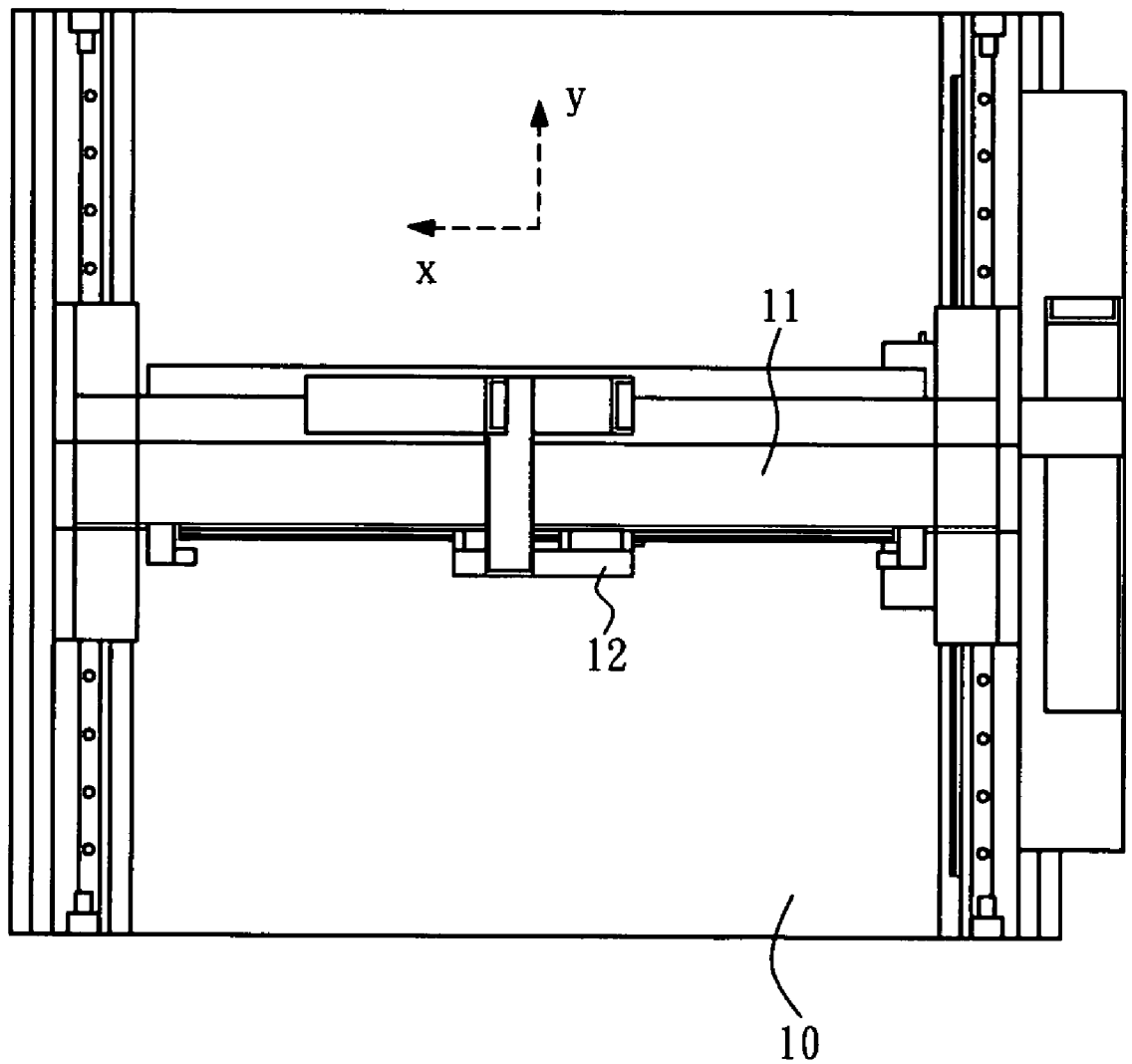
FIG. 2 is a top view of the conventional gantry machining center as shown in FIG. 1.
Figure 3:
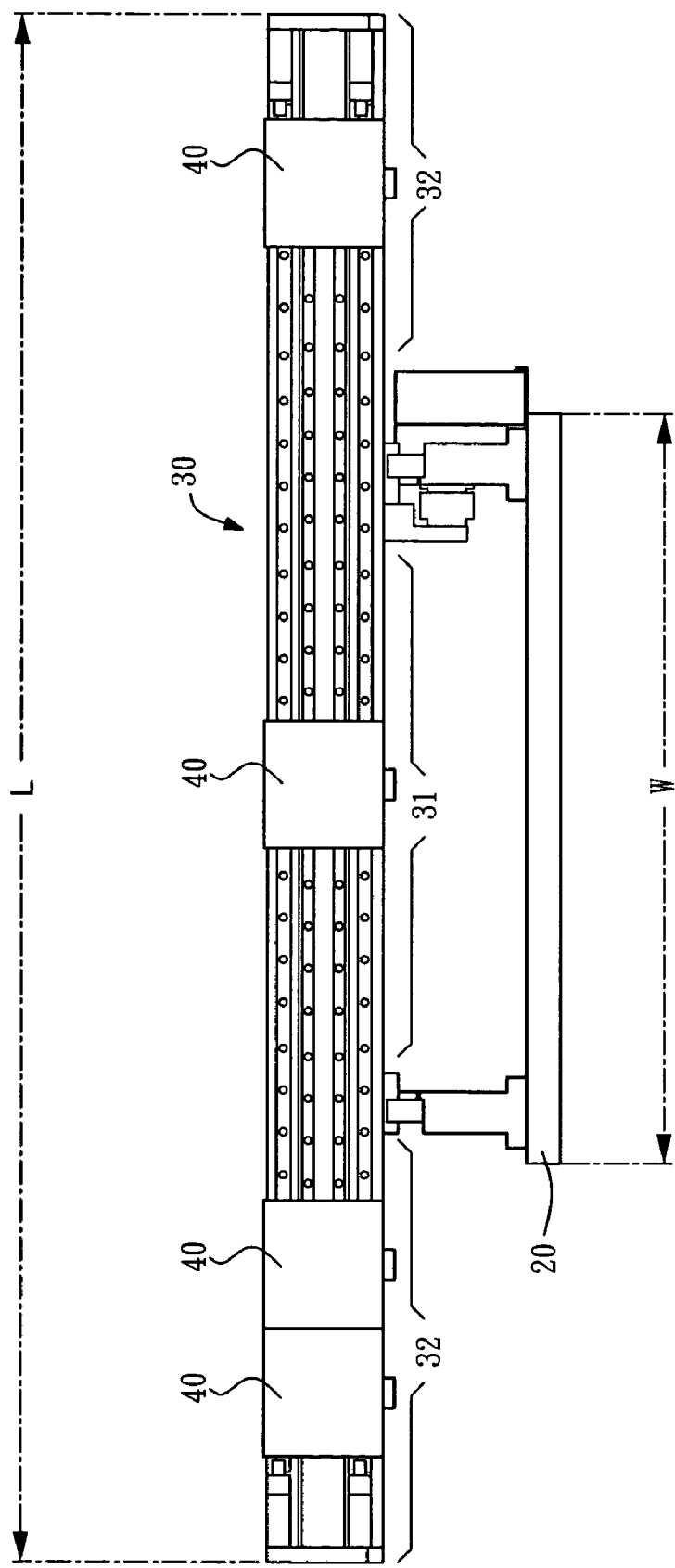
FIG. 3 is a front view of an extendable gantry of the present invention, wherein an extendable transverse bridge extends beyond and juts out two opposite laterals of the base along a direction parallel to an X-axis of a base.
Figure 4:
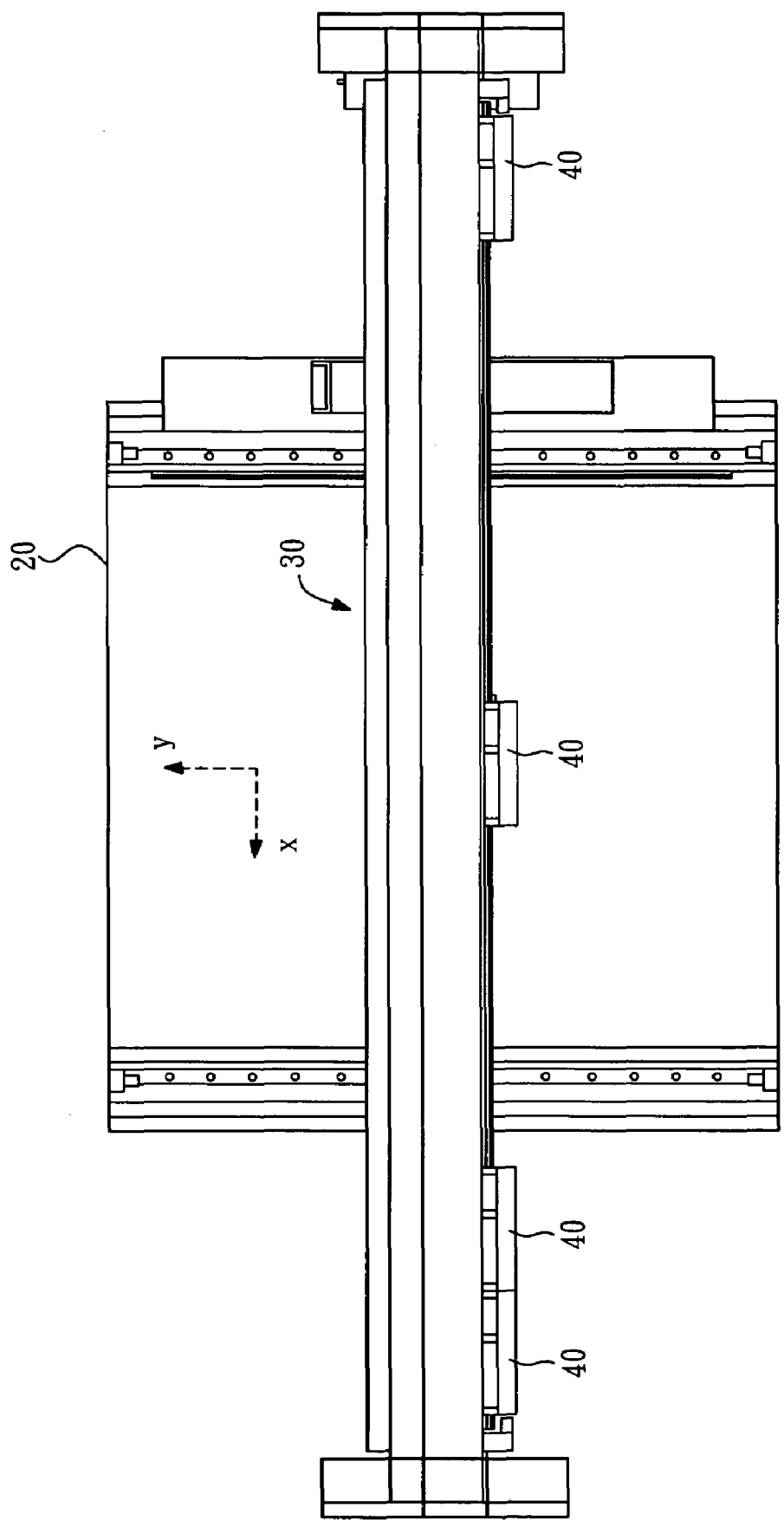
FIG. 4 is a top view of the extendable gantry of the present invention as shown in FIG. 3.

Referring to FIGS. 3 and 4, an extendable gantry proposed in the present invention primarily comprises a base 20, an extendable transverse bridge 30, and a plurality of movable seats 40.

The extendable transverse bridge 30 is mounted on the base 20 and reciprocates along a direction parallel to a Y-axis of the base 20. The extendable transverse bridge 30 has an axial length (L) greater than a width (W) of the base 20 and extends beyond and juts out either or both opposite laterals of the base 20 along a direction parallel to an X-axis of the base 20. The extendable transverse bridge 30 includes a working area 31 and at least one waiting area 32, wherein the waiting area 32 is located at a part of the extendable transverse bridge 30 jutting out a said lateral of the base 20.

The plural movable seats 40 are settled on and designed to reciprocate along the extendable transverse bridge 30. At least one of the movable seats 40 reciprocates within the working area 31 while the other movable seats 40 stay still in the waiting area 32.

The plural movable seats 40 may each carry a different tool. The tool to be used for processing a workpiece can be moved to the working area 31 with the movable seat 40 it combined with and then processes the workpiece positioned on the base. The other movable seats 40 not to be used for processing the workpiece, namely in idleness, are moved to the waiting area 32 by the movable seats 40 they combined with and stay still in the waiting area 32.

Figure 5:
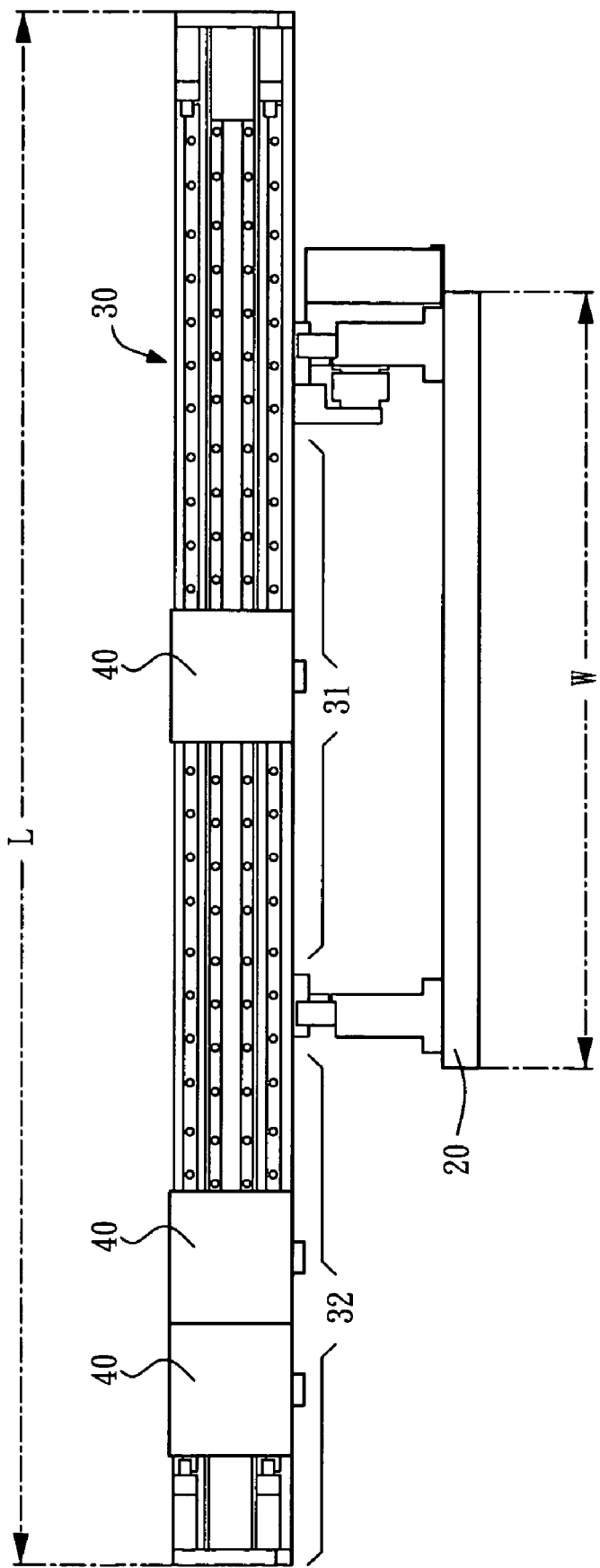
FIG. 5 is another front view of the extendable gantry of the present invention, wherein the extendable transverse bridge extends beyond and juts out the two opposite laterals of the base along the direction parallel to the X-axis of the base while a left part of the extendable transverse bridge juts out the corresponding lateral of the base further than a right part does.

FIG. 5 is a front view of the extendable gantry of the present invention, wherein the extendable transverse bridge 30 extends beyond and juts out the two opposite laterals of the base 20 along the direction parallel to the X-axis of the base 20 while a left part of the extendable transverse bridge 30 juts out the corresponding lateral of the base 20 further than a right part does. According to the drawing, the waiting area 32 is arranged at the left part of the extendable transverse bridge 30.

Figure 6:
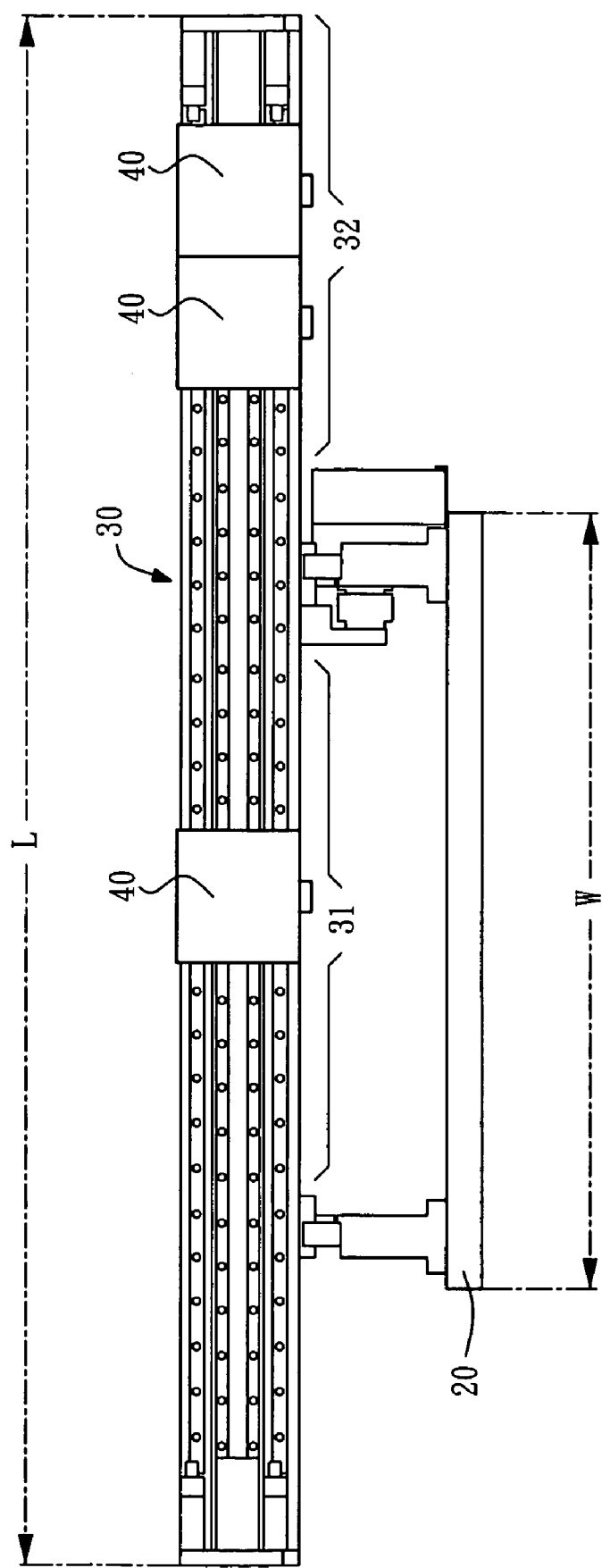
FIG. 6 is yet another front view of the extendable gantry of the present invention, wherein the extendable transverse bridge extends beyond and juts out the two opposite laterals of the base along the direction parallel to the X-axis of the base while the right part of the extendable transverse bridge juts out the corresponding lateral of the base further than the left part does.

FIG. 6 is a front view of the extendable gantry of the present invention, wherein the extendable transverse bridge 30 extends beyond and juts out the two opposite laterals of the base 20 along the direction parallel to the X-axis of the base 20 while the right part of the extendable transverse bridge 30 juts out the corresponding lateral of the base 20 further than the left part does. According to the drawing, it is the right part of the extendable transverse bridge 30 set as the waiting area 32.

The present invention structurally features that the axial length (L) of the extendable transverse bridge 30 is greater than the width (W) of the base 20 so that the plural moveable seats 40 and the tools attached thereon are allowed with a relatively constant travel length despite the number of the moveable seats 40 settled on the overall extendable transverse bridge 30 while no additional width of the overall base 20 is required. Consequently, the gantry can use relatively compact volume and small space consumption to provide a relatively long travel length of the multiple moveable seats 40, thereby eliminating additional costs for constructing the base 20 larger in the case that more moveable seats 40 are implemented.

Although the particular embodiment of the invention has been described in detail for purposes of illustration, it will be understood by one of ordinary skill in the art that numerous variations will be possible to the disclosed embodiment without going outside the scope of the invention as disclosed in the claims.

What is claimed is:

1. An extendable gantry, comprising:
    a base;
    an extendable transverse bridge, supported on the base at opposite widthwise ends of the base for reciprocating movement along a direction parallel to a horizontal Y-axis of the base, wherein the extendable transverse bridge has an axial length greater than a width of the base while extending beyond and jutting out of two opposite lateral sides of the base in the width direction of the base beyond the supports along a direction parallel to a horizontal X-axis of the base to create waiting areas; and
    a plurality of movable tool seats, settled on the extendable transverse bridge and designed to reciprocate in the direction of the X-axis along the extendable transverse bridge relative to one another, for carrying tools to be used for processing a workpiece, said extendable transverse bridge including at least one working area to which the tool seats are movable to perform the processing,
    and wherein ones of the tool seats not being used in the at least one working area are movable to the waiting areas, and wherein one of the waiting areas is of a width to permit two of the tool seats to wait therein next to each other in the X-axis direction.

2. The extendable gantry as claimed in claim 1, wherein the at least one working area is between the supports.

3. The extendable gantry as claimed in claim 1, wherein the tool seats each carry a different tool.

4. The extendable gantry as claimed in claim 1, wherein the movable tool seats not being used for processing the workpiece are moved to the waiting areas and stay still in the waiting areas while the workpiece is being processed.

5. The extendable gantry as claimed in claim 1, wherein there are four of the tool seats.

* * * * *